US012301714B2

(12) United States Patent
Ananthanarayanan et al.

(10) Patent No.: US 12,301,714 B2
(45) Date of Patent: May 13, 2025

(54) SECURE DATA INGESTION WITH EDGE COMPUTING

(71) Applicant: MICROSOFT TECHNOLOGY LICENSING, LLC, Redmond, WA (US)

(72) Inventors: Ganesh Ananthanarayanan, Sammamish, WA (US); Ramarathnam Venkatesan, Redmond, WA (US); Yuanchao Shu, Kirkland, WA (US); Kiran Muthabatulla, Redmond, WA (US); Yoganand Rajasekaran, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 253 days.

(21) Appl. No.: 17/990,646

(22) Filed: Nov. 18, 2022

(65) Prior Publication Data
US 2024/0171391 A1    May 23, 2024

(51) Int. Cl.
*H04L 9/08*    (2006.01)
*H04L 9/14*    (2006.01)

(52) U.S. Cl.
CPC .......... *H04L 9/0897* (2013.01); *H04L 9/0822* (2013.01); *H04L 9/14* (2013.01); *H04L 2209/80* (2013.01)

(58) Field of Classification Search
CPC ....... H04L 9/0897; H04L 9/0822; H04L 9/14; H04L 2209/80; H04L 9/0891; H04L 9/0894; H04L 63/06; H04L 63/04; G06F 21/10; G06F 21/60; H04W 12/04; H04W 12/10
See application file for complete search history.

(56) References Cited

U.S. PATENT DOCUMENTS

| 11,343,247 | B1 * | 5/2022 | Ozarkar | ................. H04L 67/56 |
| 2015/0074409 | A1 * | 3/2015 | Reid | ................... G06F 21/6218 713/171 |
| 2019/0173674 | A1 | 6/2019 | Agarwal | |
| 2019/0229908 | A1 * | 7/2019 | Peddada | ............... G06F 21/602 |
| 2020/0053065 | A1 | 2/2020 | Wisniewski | |
| 2020/0280547 | A1 * | 9/2020 | Rawalkshatriya | .... H04L 9/0891 |

OTHER PUBLICATIONS

International Search Report and Written Opinion received for PCT Application No. PCT/US2023/033915, Jan. 18, 2024, 15 pages.

\* cited by examiner

*Primary Examiner* — Abiy Getachew
(74) *Attorney, Agent, or Firm* — Newport IP, LLC; Jacob P. Rohwer

(57) ABSTRACT

The techniques described herein use an edge device to manage the security for a data stream being ingested by a tenant and a cloud platform. The creation of the data stream for ingestion occurs in an environment that is trusted by a tenant (e.g., an on-premises enterprise network). The cloud platform that is part of the data stream ingestion process is outside this trusted environment, and thus, the tenant loses an element of security when ingesting data streams for cloud storage and/or cloud processing. Accordingly, the edge device is configured on a trust boundary so that the data stream ingestion process associated with a cloud platform is secured, or trusted by the tenant. The edge device is configured to encrypt the data stream using a data encryption key and/or manage the protection of the data encryption key.

18 Claims, 10 Drawing Sheets

SECURE DATA INGESTION WITH EDGE COMPUTING

BACKGROUND

A cloud platform such as MICROSOFT AZURE, AMAZON WEB SERVICES, GOOGLE CLOUD, etc. is configured to provide network resources for various tenants. Stated alternatively, datacenters that comprise the cloud platform are useable to provide computing services to businesses, organizations, entities, and/or individual users (collectively referred to herein as tenants) at remote locations via network connections. Various tenants rely on data ingestion to store and/or otherwise process data that is generated at these remote locations. Consequently, data ingestion refers to moving data from one location, such as a main database in an on-premises enterprise network, to another location such as the cloud platform.

In many instances, the ingestion is implemented on sensitive data and/or in a scenario where the sensitive data to be ingested is a data stream that is continuously generated and processed to be moved from one location to the other location. For example, a financial institution may process thousands of transactions in a given time period (e.g., every few minutes, every hour, etc.) and these transactions include sensitive data logs to be transmitted in a data stream to the cloud platform for storage and/or processing. An example data log includes events such as a client request to sell a stock, an approval of the client request to sell the stock from a financial institution, a registration of the completed stock sale, etc. The financial institution may employ a workflow structured query language (SQL) ledger to log the aforementioned events for each transaction, and thus, a data stream of logged events for a number of different transactions is created for ingestion.

An ingested data stream, such as the aforementioned logged events for a number of different transactions, is exposed to network and/or cloud components that are not trusted by the tenant. Thus, a tenant loses an element of security when ingesting data streams for cloud storage and/or cloud processing. It is with respect to these considerations and others that the disclosure made herein is presented.

SUMMARY

The system described herein uses an edge device to manage the security for a data stream being ingested by a tenant and a cloud platform. Stated alternatively, the edge device secures the data stream for transmission from a trusted environment to an untrusted environment. The creation of the data stream for ingestion is typically done in an environment that is trusted by a tenant. For example, the tenant may operate and administer its own secure network (e.g., an on-premises enterprise network) that connects various on-premises devices (e.g., server devices, desktop devices, networking devices, etc.) with one another. In another example, the tenant may configure network protocols and/or security formats so that secure communications are enabled between its own devices (e.g., user devices, Internet of Things (IoT) devices, networking devices, etc.).

However, a cloud platform that is part of the data stream ingestion process is outside this environment that is trusted by the tenant. Consequently, the tenant loses an element of security when ingesting data streams for cloud storage and/or cloud processing, as described above. The edge device described herein is configured on a trust boundary so that the data stream ingestion process associated with a cloud platform is secured, or trusted by the tenant. In other words, the techniques described herein extend the environment that is trusted by the tenant.

The trust boundary is defined by a tenant of a cloud platform. The trust boundary is established to include devices and/or networks in which data communication are known to be secure. Accordingly, a device on the trust boundary that is configured to implement operations to secure the ingestion of a data stream to a cloud platform that is outside the trusted environment is referred to as an "edge" device. The operations include the encryption of data for transmission and/or storage, the protection of data encryption keys, and so forth. The tenant configures the trusted environment so that sensitive data streams, which are generated within the trusted environment (i.e., inside the trust boundary), yet intended for transmission to the cloud platform are required to go through an edge device. As mentioned above, one example of sensitive data streams relates to transactions implemented by financial institutions. Another example of sensitive data streams includes private video (e.g., traffic video, education institution video, retail store video, casino video, etc.) captured at remote locations that needs to be analyzed for security purposes.

The edge device is configured to establish and maintain a network connection to a cloud platform (e.g., an access point of the cloud platform). The network connection is used to transmit, or ingest, the data stream being input to the edge device from other devices in the trusted environment. To implement the secure operations, the edge device is one that is configured with a hardware security module. The hardware security module is a physical device that safeguards and manages keys and performs encryption and decryption functions via secure cryptographic processors or chips. The hardware security module can be embedded in the edge device, a plug-in card that is inserted into the edge device, or an external device that attaches directly to the edge device. Many of the operations described herein are implemented by the hardware security module to ensure that the data stream and/or the keys are protected.

The edge device is configured to securely store a data encryption key usable to encrypt the data stream being input to the edge device. Moreover, the edge device is configured to ensure that the data encryption key is protected while the data encryption key is being used to encrypt the data stream. The protection of the data encryption key accounts for scenarios where the edge device is disconnected from the cloud platform. As described in further detail below, the edge device is configured to receive a first version of a data encryption key from the cloud platform via a network connection. The network connection is an untrusted network connection because it is used by the edge device to transmit data outside the trusted environment. Moreover, the network connection is constant in the sense that the data stream can continuously be transmitted to the cloud platform. The first version of the data encryption key is encrypted using a network master key that is stored in the cloud platform. This protects the data encryption key from being exposed to compromised components.

The network master key is stored in a key vault of the cloud platform. The key vault of the cloud platform is a cloud service that is trusted by the tenant. A tenant owns and manages their own instance of a key vault. As part of this ownership and management, the tenant can grant, to specific users and/or specific devices, access to the secrets in the key vault (e.g., the master network key). Moreover, the tenant can control parameters for the secrets, such as when the master network key is to be rotated.

The edge device encrypts a first portion of the data stream using the first version of the data encryption key and transmits the encrypted first portion of the data stream, along with the first version of the data encryption key, to the cloud platform. This occurs until the edge device is disconnected from the cloud platform (e.g., the network connection is lost). Even though the edge device is no longer connected to the cloud platform, the edge device continues receiving the data stream for ingestion as the data stream continues to be generated within the trusted environment.

In response to a network disconnection, the edge device is configured to switch the manner in which the data encryption key is protected. Specifically, the edge device is configured to encrypt the data encryption key using a local master key that is stored in the hardware security module of the edge device. This generates a second version of the data encryption key. The edge device generates the second version of the data encryption key for the period of disconnection in case the key vault rotates, or changes, the network master key during the period of disconnection. While disconnected from the cloud platform, the edge device encrypts a second portion of the data stream, which is not able to be immediately transmitted to the cloud platform, using the second version of the data encryption key. The edge device stores the encrypted second portion of the data stream in local storage at the edge device while the edge device is disconnected from the cloud platform.

Then, after the network connection is restored, the edge device receives a third version of the data encryption key from the cloud platform and transmits the encrypted second portion of the data stream to the cloud platform along with the third version of the data encryption key. The third version of the data encryption key is generated by re-encrypting the data encryption key using the network master key stored in the key vault of the cloud platform. This enables effective and efficient synchronization between the edge device and the cloud platform, as the second portion of the data stream stored locally at the edge device does not need to be re-encrypted because the same data encryption key is used to encrypt both the first and second portions of the data stream. Consequently, the techniques described herein provide a benefit to tenants of the cloud platform because the edge device does not need to expend the resources (e.g., processing resources) to re-encrypt a large amount of data. Instead, the techniques described herein change the manner in which the data encryption key is protected to account for a network disconnection. That is, the data encryption key is encrypted using the network master key when the edge device is connected to the cloud platform and the data encryption key is encrypted using the local master key when the edge device is not connected to the cloud platform.

Additionally, after the network connection is restored, the edge device encrypts a third portion of the data stream using the third version of the data encryption key and transmits the encrypted third portion of the data stream, along with the third version of the data encryption key, to the cloud platform.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The techniques disclosed herein use an edge device to manage the security for a data stream being ingested by a tenant and a cloud platform. The creation of the data stream for ingestion occurs in an environment that is trusted by a tenant (e.g., an on-premises enterprise network). The cloud platform that is part of the data stream ingestion process is outside this trusted environment, and thus, the tenant loses an element of security when ingesting data streams for cloud storage and/or cloud processing. Accordingly, the edge device is configured on a trust boundary so that the data stream ingestion process associated with a cloud platform is secured, or trusted by the tenant. The edge device is configured to encrypt the data stream using a data encryption key and/or manage the protection of the data encryption key.

Figure 1:
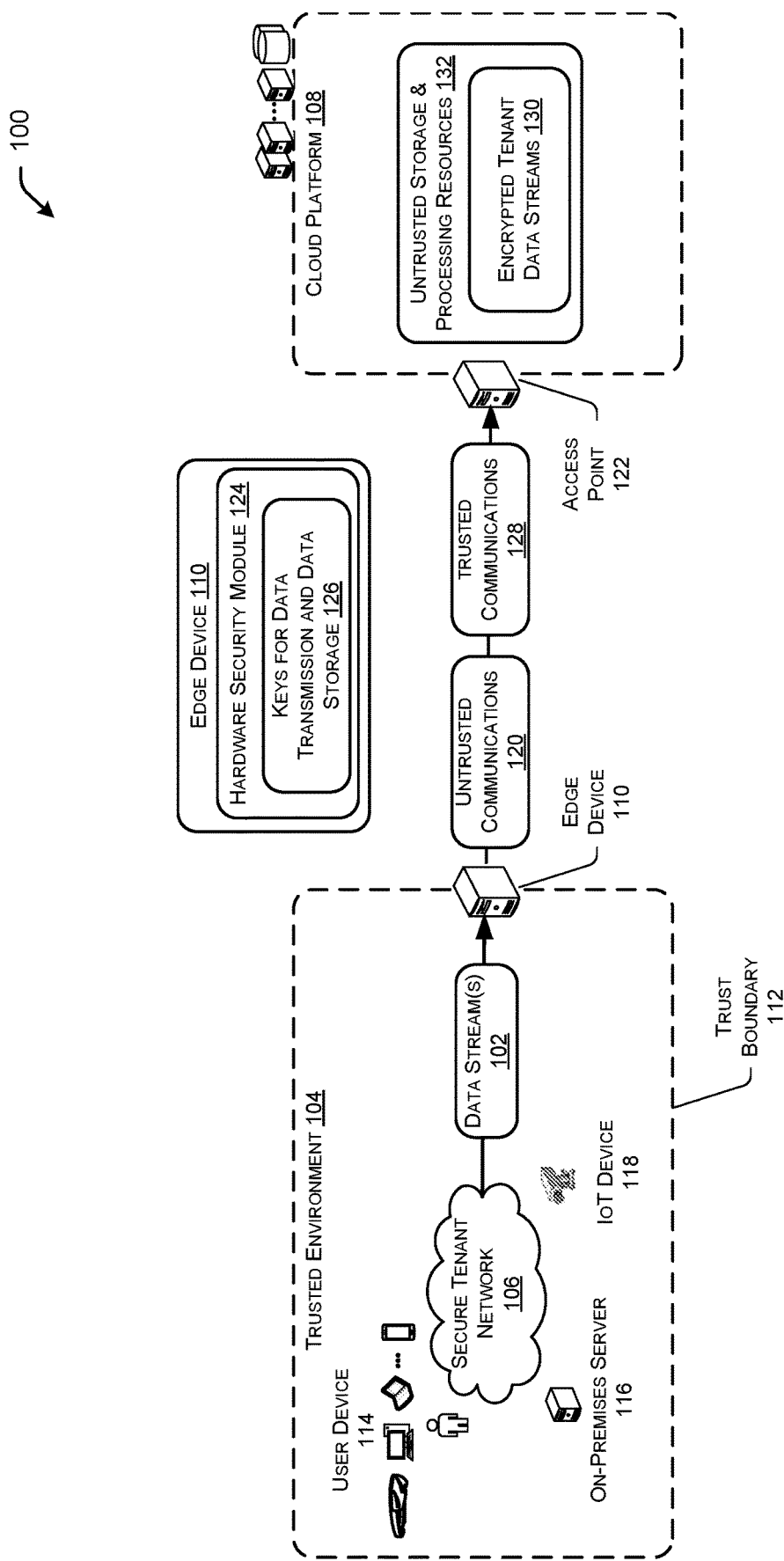
FIG. 1 illustrates an example environment in which a data stream being ingested is securely managed via an edge device with a hardware security module.

FIG. 1 illustrates an example environment 100 in which data stream(s) 102 generated within in a trusted environment 104, which includes a secure tenant network 106, are ingested for storage and/or processing at a cloud platform 108. As described above, ingesting a data stream 102 includes moving data from one location (e.g., the trusted environment 104) to another location (e.g., a datacenter in the cloud platform 108).

The data stream ingestion is implemented by an edge device 110 configured on a boundary 112 of the trusted environment 104 (illustrated in the FIGS. as a "trust" boundary). A tenant defines the trust boundary 112 for the trusted environment 104 and/or the secure tenant network 106. The trust boundary 112 includes a layer, or place, in a network hierarchy where data communications are secured by the tenant. Stated alternatively, the devices configured to handle tenant data, such as the data stream(s) 102, within the trust boundary 112 are trusted. However, tenant data to be communicated outside the trust boundary is secured, as described below.

In one example, the secure tenant network 106 can include an on-premises network operated and/or administered by the tenant. The on-premises network can include a connected user device 114 (e.g., a head-mounted display device, a desktop device, a laptop device, a smartphone device, etc.), a connected on-premises server 116, and/or a connected Internet of Things (IoT) device 118 (e.g., a video camera, a sensor, etc.), each of which may contribute to the generation, processing, and/or communication of the data steam(s) 102 intended for the cloud platform 108.

In another example, the trust boundary 112 can be established by a network operator (e.g. 5G network operator), and the edge device 110 may be part of a private multi-access edge computing (MEC) node (e.g., a base station at the edge of a 5G network), as MEC nodes often suffer from network disconnection and/or varying network connection quality.

In contrast to the tenant-secured communications within the trusted environment 104, communications to a layer in the network hierarchy outside the trust boundary 112 are often not secured by the tenant. One reason for this is because the tenant typically does not operate and/or administer networks that are external to the trusted environment 104 (e.g., mobile operator networks, datacenter networks, wide area networks, etc.). Conventional communications outside the trust boundary 112 (e.g., ingesting a data stream 102 to the cloud platform 108) are represented in FIG. 1 as untrusted communications 120.

To ensure the tenant data, such as the data stream(s) 102, is secured outside the trust boundary 112, the edge device 110 is placed on the trust boundary 112. The tenant implements a requirement that the data streams 102 intended to leave the trusted environment 104 do so through the edge device 110. Accordingly, the edge device 110 is configured to establish and maintain a network connection to an access point 122 (e.g., a server) of the cloud platform 108.

The edge device 110 is configured with a hardware security module 124. As described above, the hardware security module 124 is a physical device that safeguards and manages keys used for data transmission and/or for data storage 126. The keys are useable to perform encryption functions via secure cryptographic processors or chips. The hardware security module 124 can be embedded in the edge device 110, a plug-in card that is inserted into the edge device 110, or an external device that attaches directly to the edge device 110. Many of the operations described herein are implemented by the hardware security module 124 to ensure that a data stream 102 and/or the keys are protected via the use of encryption.

Accordingly, a data stream 102 to be ingested, or transmitted, to the cloud platform 108 is encrypted. Consequently, the previously untrusted communication(s) 120 involving the data streams 102 are transformed into trusted communication(s) 128 via the techniques described herein. The encrypted data streams 130 can be securely stored and/or otherwise processed by untrusted storage and processing resources 132 in the cloud platform 108, as shown in FIG. 1. Extending the trust zones from the trusted environment 104 to the network connection (e.g., the trusted communications 128) and the cloud platform 108 is important for tenants that ingest sensitive types of data (e.g., logged events for transactions implemented by financial institutions, private video used for security, etc.).

The size of the trusted environment 104 and/or a number of edge devices 110 configured to securely ingest the data stream(s) 102 may vary from one tenant of the cloud platform 108 to another. This variation may depend on a number of factors, such as type of data being ingested, an amount of data being ingested, the desired speed at which the data is to be ingested and so forth. For example, a company with multiple different office locations in different commercial buildings may configure an edge device 110 for each office location (e.g., each commercial building). In another example, a traffic monitoring organization that manages a network of traffic cameras may configure an edge device 110 for a small group of geographically proximate intersections (e.g., one, two, three, four, etc.) where a subset of the traffic cameras are deployed. In yet another example, a municipality agency that deploys employees and/or devices within a city may configure a number of edge devices 110 (e.g., two, three, four, etc.) throughout the city. In a final example, an electronic commerce company that operates a large warehouse for the storage and shipment of items may configure a number of edge devices 110 (e.g., two, three, four, etc.) in the large warehouse.

Figure 2A:
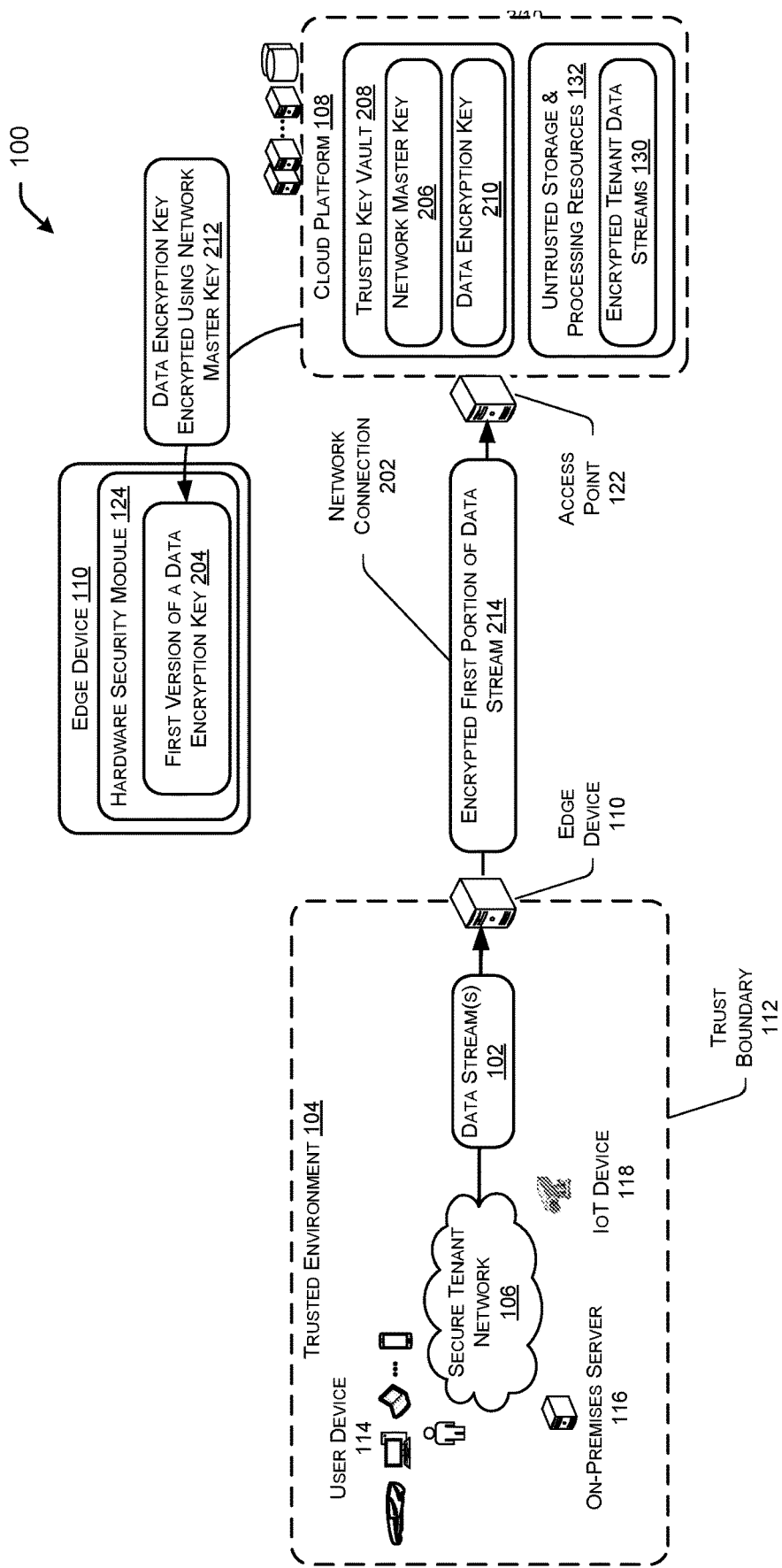
FIG. 2A illustrates the example environment of FIG. 1 in which a first portion of the data stream being ingested, via a network connection to a cloud platform, is encrypted by the hardware security module of the edge device using a first version of a data encryption key.
Figure 2B:
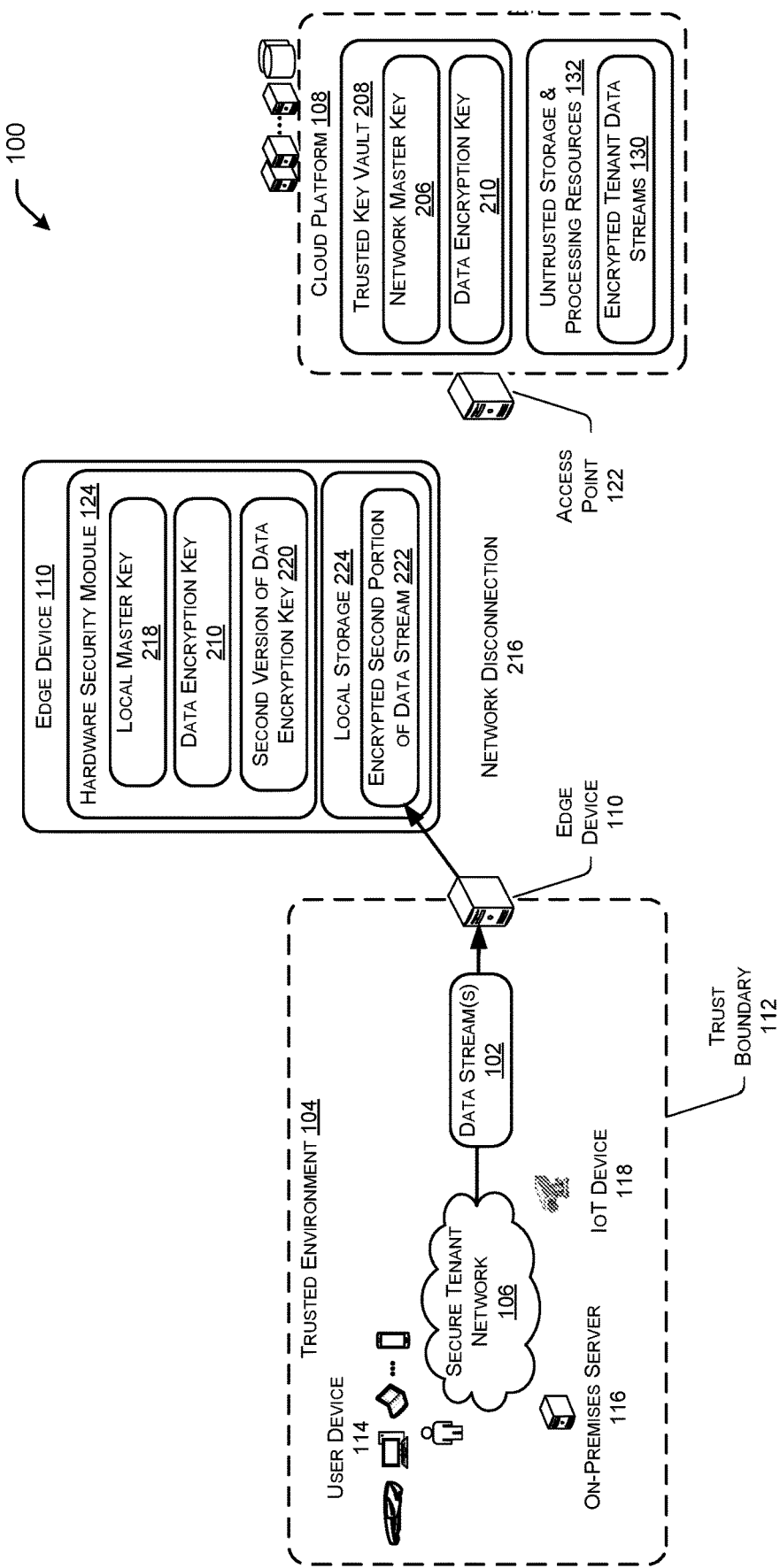
FIG. 2B illustrates the example environment of FIG. 1 in which a second portion of the data stream being ingested for storage, while the edge device is disconnected from the cloud platform, is encrypted by the hardware security module of the edge device using a second version of the data encryption key.
Figure 2C:
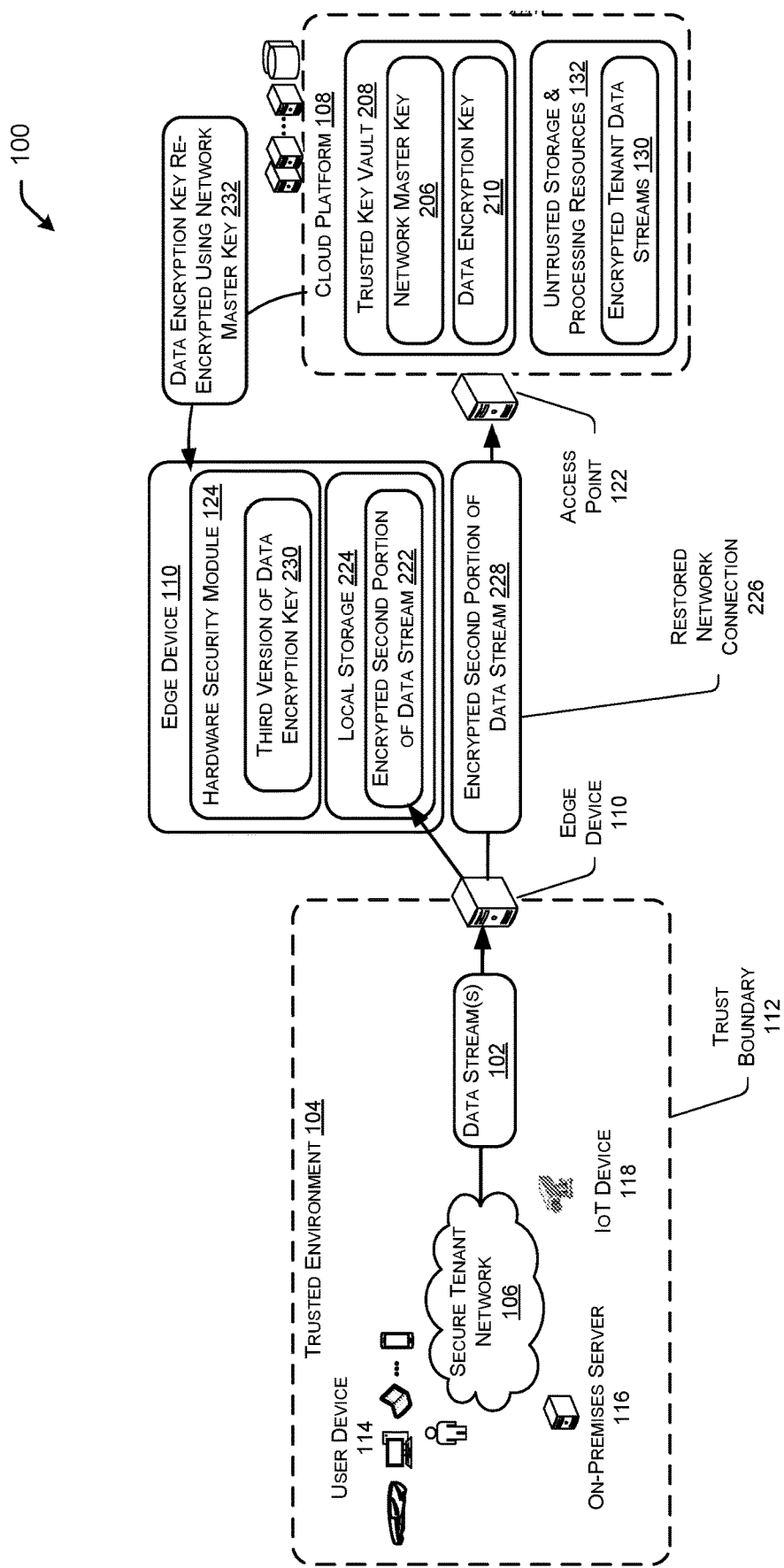
FIG. 2C illustrates the example environment of FIG. 1 in which the locally stored second portion of the data stream, which is already encrypted, is ingested to the cloud platform via a restored network connection.

As described herein with respect to FIGS. 2A-2C, the edge device 110 is configured to ensure that the data streams 102 are encrypted for transmission to the cloud platform 108, as well as for storage at the edge device 110 when a network connection between the edge device 110 and/or the access point 122 in the cloud platform 108 fails or lacks sufficient quality with respect to throughput and/or latency. FIG. 2A illustrates the example environment 100 of FIG. 1 in which a first portion of a data stream 102 being ingested, via a network connection 202 to the cloud platform 108, is encrypted by the hardware security module 124 of the edge device 110 using a first version of a data encryption key 204.

The edge device 110 is configured to receive the first version of the data encryption key 204 from the cloud platform 108 via the network connection 202. The first version of the data encryption key 204 is encrypted using a network master key 206 that is stored in a key vault 208 of the cloud platform 108. The key vault 208 of the cloud platform 108 is a cloud service that is trusted by the tenant, and thus, FIGS. 2A-4 illustrate that the key vault is a "trusted" key vault 208. The trust stems from a configuration where the tenant owns and manages their own instance of a key vault 208. As part of this ownership and management, the tenant can grant, to specific users and/or specific devices (e.g., edge device 110), access or exposure to the secrets in the key vault 208 (e.g., the master network key 206). Moreover, the tenant can control parameters for the secrets, such as when the master network key 206 is to be rotated, as described below with respect to FIG. 3.

Accordingly, the network master key 206 is used to encrypt the data encryption key 210 in the cloud platform in order to protect the data encryption key 210 from being exposed to untrusted and/or compromised components in network(s) between the trusted environment 104 and the cloud platform 108, or within the cloud platform 108 itself. The cloud platform provides the data encryption key 210 which has been encrypted using the network master key 206, as captured via element 212 in FIG. 2A. Accordingly, the edge device 110 receives the first version of the data encryption key 204 from the cloud platform 108 and encrypts a data stream 102 using the first version of the data encryption key 204. The cloud platform 108 provides the first version of the data encryption key 204 to the edge device 110 because the network master key 206 is prohibited from leaving the key vault 208 for security reasons.

The edge device 110 is configured to use the first version of the data encryption key 204 to encrypt the data stream 102 as long as the network connection 202 is continuously maintained, the data stream 102 continues to be ingested, and/or the network master key 206 is not rotated for security. Therefore, FIG. 2A illustrates that the edge device uses the first version of the data encryption key 204 to encrypt and transmit, via the network connection 202, an encrypted first portion of the data stream 214 to the cloud platform 108 (e.g., via the access point 122). The edge device 110 also transmits the first version of the data encryption key 204 to the cloud platform 108 along with the encrypted first portion of the data stream 214. By transmitting the version(s) of the data encryption key along with the encrypted portion(s) of the data stream, the key vault 208 is stateless in the sense that it is not required to store the context needed to match its own copy of the data encryption key with the incoming encrypted data stream when the incoming encrypted data stream arrives. Implementing a stateless key vault 208 improves the security and the efficiency with which the techniques described herein are implemented.

Transmission of the encrypted first portion of the data stream 214 occurs until the edge device 110 loses the network connection 202 to the cloud platform 108, as shown via the network disconnection 216 in FIG. 2B. Alternatively, transmission of the encrypted first portion of the data stream 214 occurs until the network connection 202 lacks sufficient quality with respect to throughput and latency. Even though the edge device 110 is no longer connected to the cloud platform 108, or lacks a sufficient quality connection to the cloud platform 108, the edge device 110 continues receiving the data stream 102 for ingestion as the data stream 102 continues to be generated within the trusted environment 104.

In response to the network disconnection 216 or a low quality network connection, the edge device 110 is configured to switch the manner in which the data encryption key 210 is protected. Specifically, the edge device 110 is configured to encrypt the data encryption key 210 using a local master key 218 that is stored in the hardware security module 124 of the edge device 110. This generates a second version of the data encryption key 220.

While disconnected from the cloud platform 108 or during the period of a low quality network connection, the edge device 110 encrypts a second portion of the data stream, which is not able to be immediately transmitted to the cloud platform 108, using the second version of the data encryption key 220. The edge device 110 stores the encrypted second portion of the data stream 222 in local storage 224 at the edge device 110 while the edge device 110 is disconnected from the cloud platform 108. The edge device 110 generates the second version of the data encryption key 220 for the period of disconnection or low quality connection in case the key vault 208 rotates, or changes, the network master key 206.

Then, after the network connection is restored 226 as shown in FIG. 2C, the edge device 110 can transmit the encrypted second portion of the data stream 228 to the cloud platform. The second portion of the data stream 228 is transmitted along with a third version of the data encryption key 230. The third version of the data encryption key 230 is generated in the cloud platform 108 by re-encrypting the data encryption key 210 using the network master key 206, as captured by element 232. This enables effective and efficient synchronization between the local storage 224 of the edge device 110 and the untrusted storage 132 of the cloud platform 108, as the encrypted second portion of the data stream 222 stored locally at the edge device 110 does not need to be re-encrypted because the same data encryption key 210 is used to encrypt both the first and second portions of the data stream. Consequently, the techniques described herein provide a benefit to tenants of the cloud platform because the edge device 110 does not need to expend the resources (e.g., processing resources) to re-encrypt a large amount of data. Instead, the techniques described herein change the manner in which the data encryption key 210 is protected to account for a network disconnection 216 or a low quality connection. That is, the data encryption key 210 is encrypted using the network master key 206 when the edge device 110 is connected to the cloud platform 108 and the data encryption key 210 is encrypted using the local master key 218 when the edge device is not connected to the cloud platform 108 or does not have a network connection of sufficient quality.

Figure 2D:
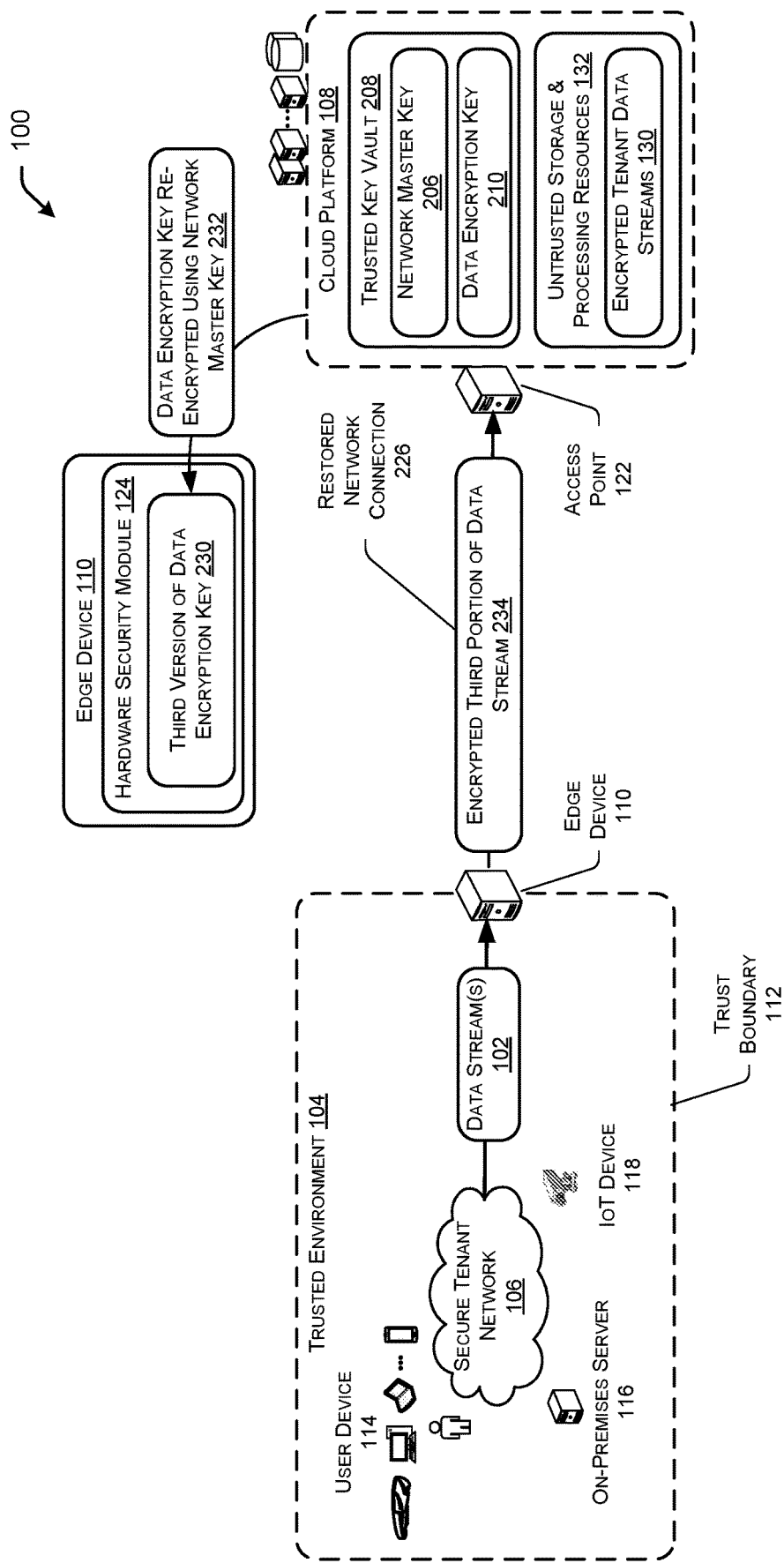
FIG. 2D illustrates the example environment of FIG. 1 in which a third portion of the data stream being ingested, via the restored network connection to the cloud platform, is encrypted by the hardware security module of the edge device using a third version of the data encryption key.

FIG. 2D illustrates the example environment 100 of FIG. 1 in which a portion of the data stream 102 received after the network connection is restored 226 is encrypted using the third version of the data encryption key. The edge device 110 encrypts a third portion of the data stream 234 using the third version of the data encryption key 230 and transmits the encrypted third portion of the data stream 234, along with the third version of the data encryption key 230, to the cloud platform 108.

Figure 3:
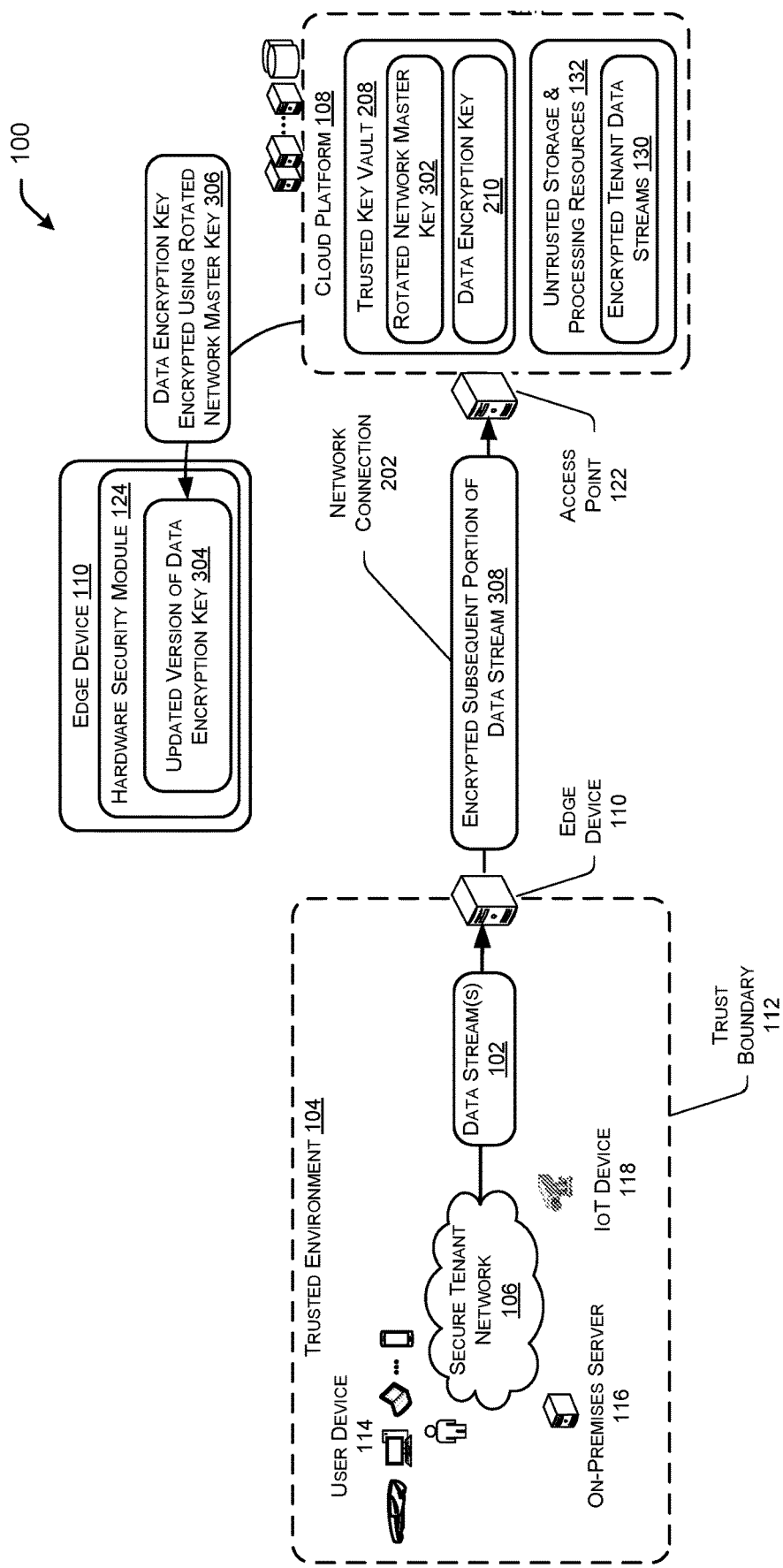
FIG. 3 illustrates the example environment of FIG. 1 in which a network master key is rotated.

FIG. 3 illustrates the example environment 100 of FIGS. 1 and 2A in which a network master key is rotated (e.g., changed, switched out) for security reasons. Accordingly, FIG. 3 shows a rotated network master key 302 in the trusted key vault 208. Moreover, FIG. 3 shows that an updated version of the data encryption key 304 is provided, by the cloud platform 108, to the edge device 110. The updated version of the data encryption key 304 is generated by encrypting the data encryption key 210 using the rotated network master key, as captured by element 306. Accordingly, the edge device is configured to encrypt a subsequent portion of the data stream 102 using the updated version of the data encryption key 304 and transmit the encrypted portion of the data stream 308 to the cloud platform 108. The edge device 110 and/or the cloud platform 108 are not required to re-encrypt the data stream itself because the whole data stream has been encrypted using the same data encryption key 210. This conserves the resources of the edge device and/or the cloud platform.

Figure 4:
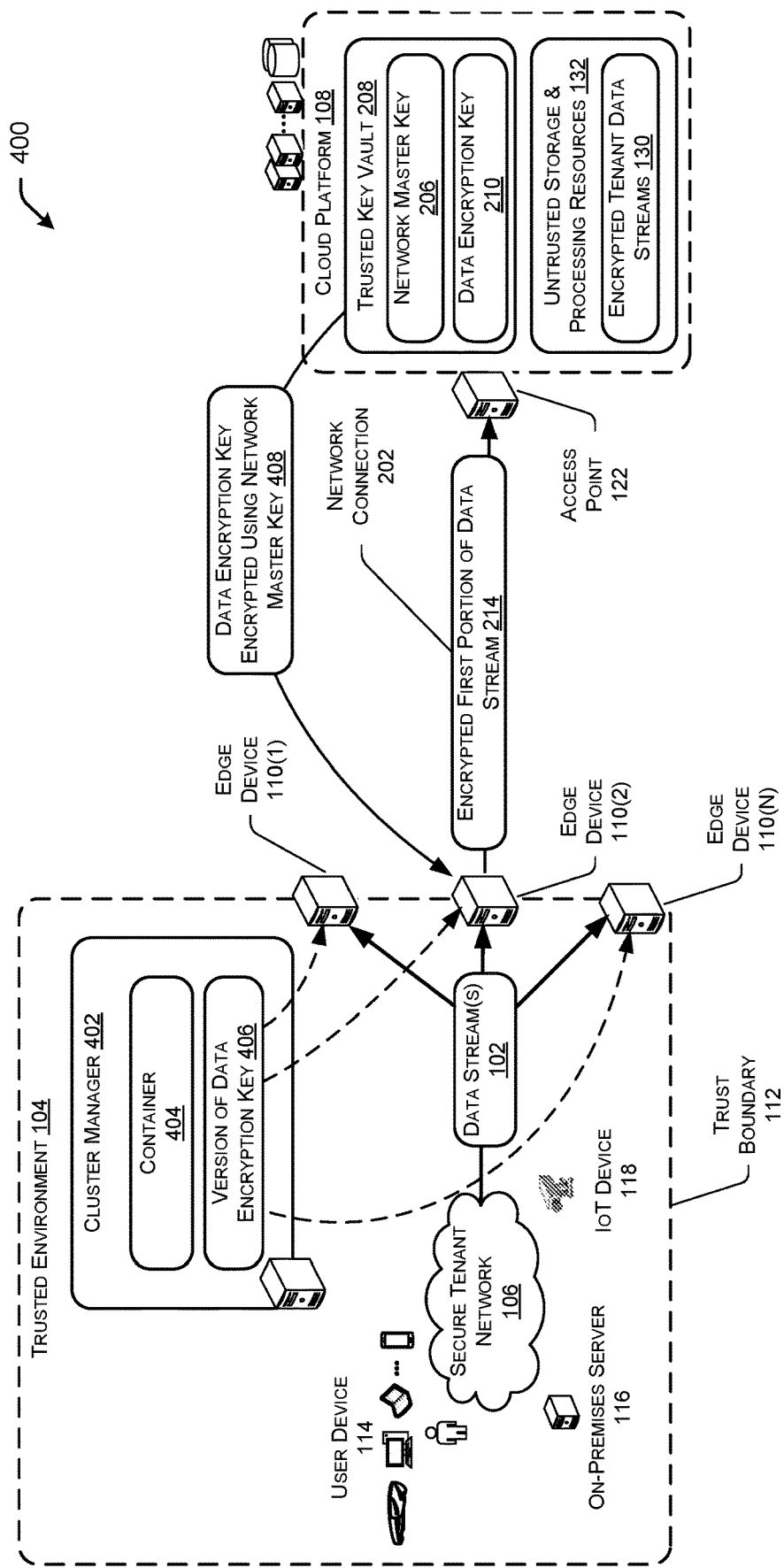
FIG. 4 illustrates an example environment in which a data stream being ingested is securely managed by a cluster of edge devices associated with a cluster manager.

FIG. 4 illustrates an example environment 400 in which a data stream 102 being ingested is securely managed by a cluster of edge devices 110(1-N) associated with a cluster manager 402. The cluster manager 402 includes a container 404 configured to implement the data ingestion at various ones of the edge devices 110(1-N). In FIG. 4, a container 404 deployed to an edge device 110(2) logs a version of the data encryption key 406 with the cluster manager 402 so the version of the data encryption key can be distributed to other edge devices 110(1) and 110(N) in association with other container 404 deployments. Accordingly, the edge device 110(2) receives a version of the data encryption key 406 from the cloud platform 108. Again, the version of the data encryption key 406 is generated by encrypting the data encryption key 210 with the network master key 206, as captured via element 408.

One of the advantages of using the cluster manager 402 relates to scaling the use of the container 404 to meet demand (e.g., implementing load balancing). For example, the number of edge devices in the cluster of edge devices edge devices 110(1-N) to which the container 404 is deployed is determined based on a resource capacity required to ingest the data stream. Stated alternatively, the schedule device 402 is configured to determine an amount of resources needed to efficiently and effectively process the data stream 102, and schedule the deployment of the container 404 accordingly. To this end, the cluster manager 402 is configured to deploy the container 404 to the edge devices 110(1-N) and provide the version of the data encryption key 406 with the deployed container 404 so that the individual edge devices 110(1-N) can implement the ingestion previously discussed (e.g., encrypt the data stream 102 and transmit the data stream 102 for cloud storage and processing).

Another advantage of using the cluster manager 402 relates to dealing with edge device failures and the ability to implement a failover process to ensure data ingestion is not interrupted and data loss is limited or non-existent. For example, the schedule device 402 is configured to determine one edge device 110(1) that has failed and is no longer connected to the cloud platform 108. In response to this determination, the cluster manager 402 can immediately deploy the container 404 to another edge device 110(2) in the cluster of edge devices. Consequently, implementing the cluster manager 402 improves the fault tolerance of the system. In various examples, the cluster manager 402 and the cluster of edge devices 110(1-N) are part of a scheduling/orchestration system such as Kubernetes.

In various examples, the cluster manager 402 and the cluster of edge devices 110(1-N) are configured in association with a cellular network (e.g., a 5G network). Consequently, an edge device 110 may be part of a private multi-access edge computing (MEC) node (e.g., a base station at the edge of the 5G network). Because MEC nodes often suffer from network disconnection and/or varying network connection quality, the cluster manager 402 can move a container 404, or deploy a new container 404 upon a network disconnection or when the network quality (e.g., a latency or a throughput measurement) drops below a quality threshold. The network quality measurements can be provided by network application programming interfaces (APIs) that belong to the operators of the cellular networks.

Another reason to move, or redeploy, a container from one edge device 110(1) to another edge device 110(2) is because private MECs execute 5G "core" containers in conjunction with the container 404 implementing secure data stream ingestion. A spike in resource demand caused by the 5G core containers may necessitate migration of the container 404 from one edge device 110(1) to another edge device 110(2).

In another example, the secure data stream ingestion can be implemented as a pipeline of containers that span multiple edge devices. For example, a first edge device 110(1) in the pipeline can be a private MEC and a second edge device 110(2) in the pipeline can be a public MEC. The pipeline includes secure connectivity between the private MEC and the public MEC. If the private MEC loses uplink connection, the private MEC cannot continue the data stream ingestion, as described above. In this pipeline scenario, the private MEC caches the intermediate data stream ingestion data from the operations that execute on the private MEC, and then when network connectivity is restored, the private MEC finishes the data stream ingestion operations by sending the intermediate data stream ingestion data to the public MEC. The public MEC then transmits the ingested data stream to the cloud platform.

Consequently, the cluster of edge devices 110(1-N) can span geographic locations such as a connected automobile, a public MEC device/node, an on-premises server, etc. The cluster of edge devices 110(1-N) is not restricted to one site or one location.

Figure 5:
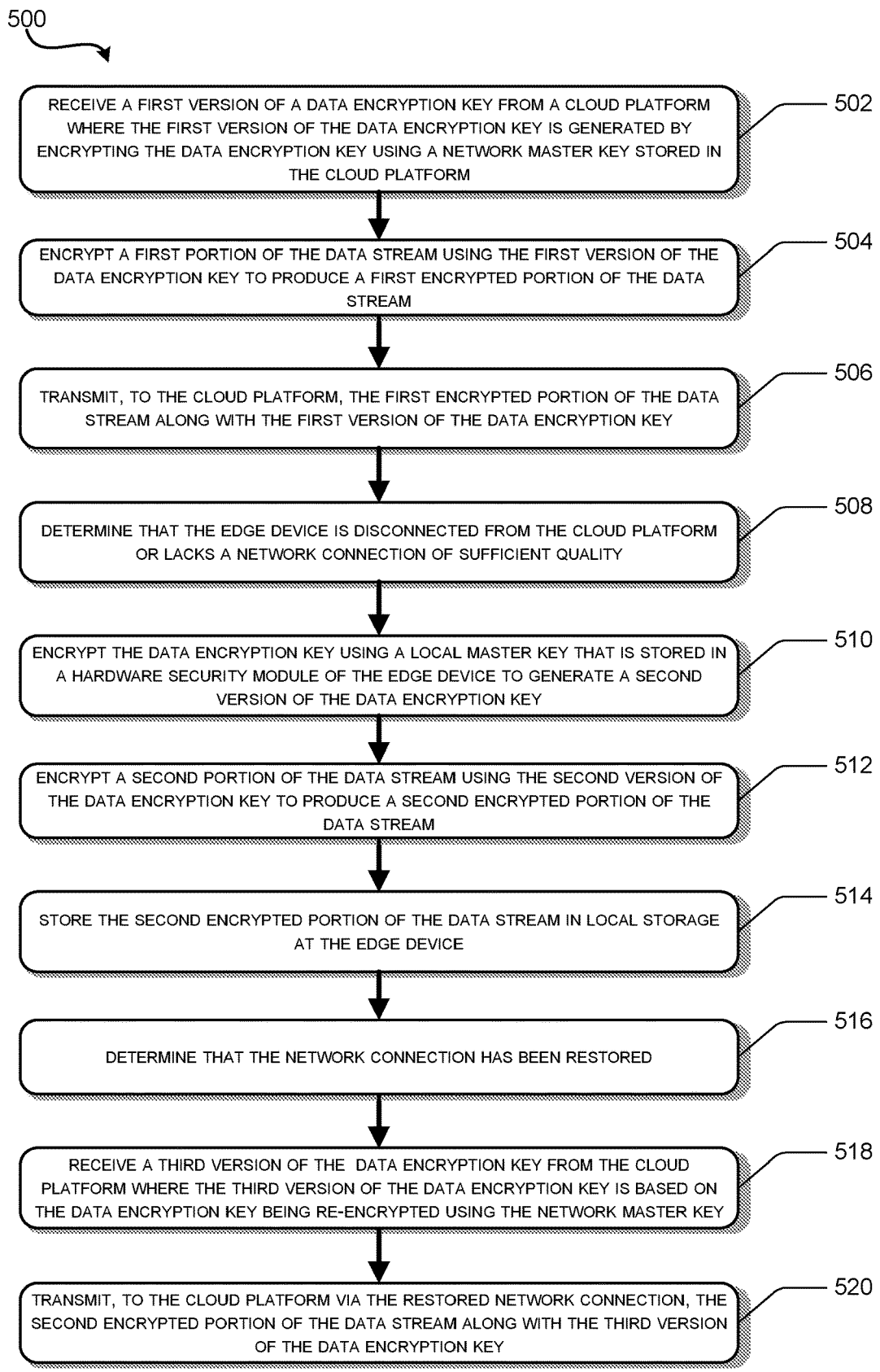
FIG. 5 is a flowchart depicting an example process for ingesting a data stream in light of a network connection disruption by using different versions of a data encryption key.
Figure 6:
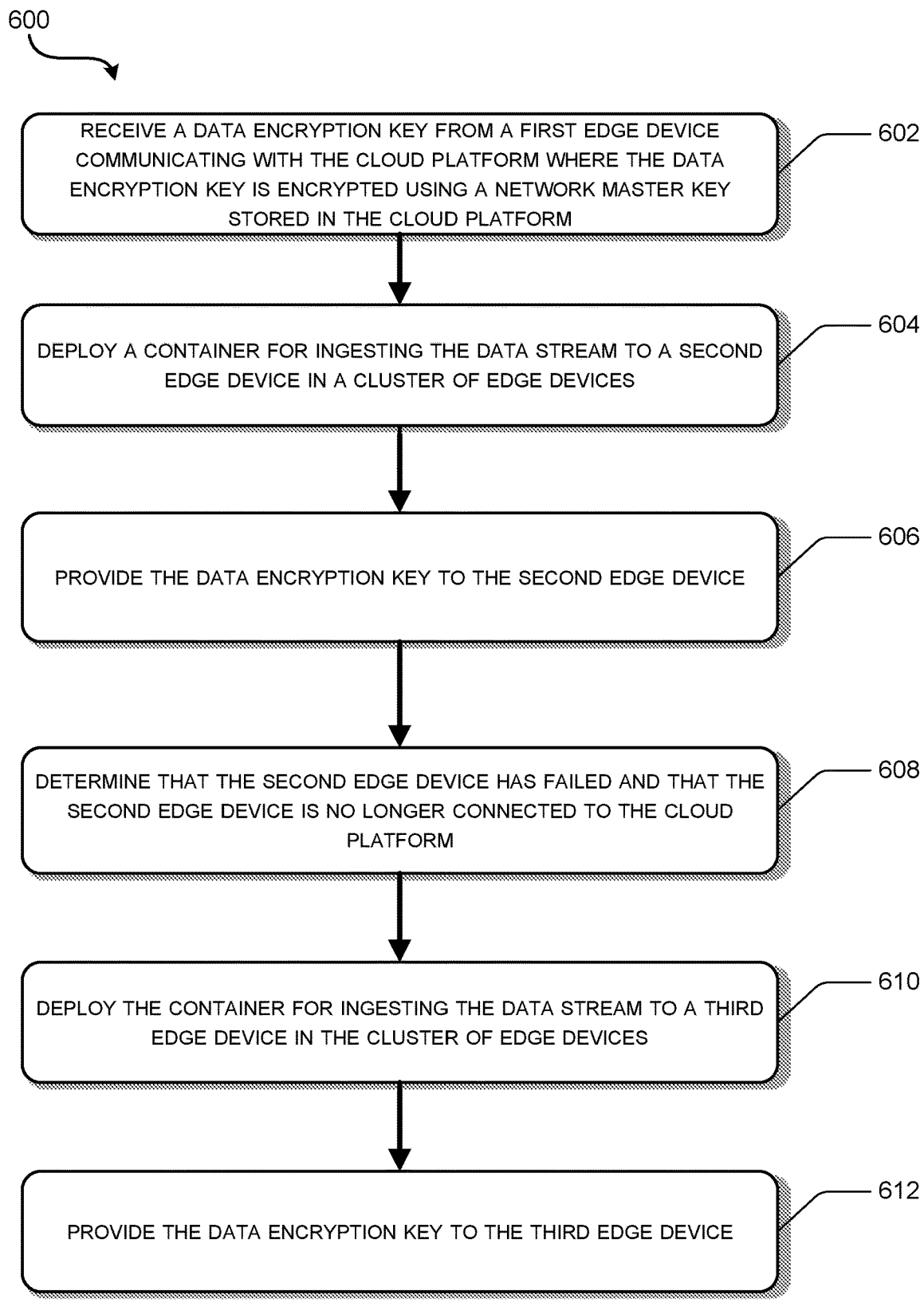
FIG. 6 is a flowchart depicting an example process for securely managing a cluster of edge devices for data stream ingestion.

Turning now to FIGS. 5 and 6, example operational procedures for implementing the examples described above are illustrated. The operational procedures can be implemented by the components illustrated in FIGS. 1-4.

It should be understood by those of ordinary skill in the art that the operations disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated operational procedures can end at any time and need not be performed in their entireties. Some or all operations of the operations can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. The implementation is a matter of choice dependent on the performance and other requirements of the computing system. Accordingly, the logical operations may be implemented in software, in firmware, in special purpose digital logic, and any combination thereof.

FIG. 5 is a flowchart depicting an example process 500 for ingesting a data stream in light of a network connection disruption by using different versions of a data encryption key.

At operation 502, an edge device receives a first version of a data encryption key from the cloud platform via a network connection established between the edge device and the cloud platform. The first version of the data encryption key is generated by encrypting the data encryption key using a network master key stored in the cloud platform.

At operation 504, the edge devices encrypts a first portion of the data stream using the first version of the data encryption key to produce a first encrypted portion of the data stream.

At operation 506, the edge device transmits, to the cloud platform, the first encrypted portion of the data stream along with the first version of the data encryption key.

At operation 508, it is determined that the edge device is disconnected from the cloud platform or lacks a network connection of sufficient quality.

At operation 510, the edge device encrypts the data encryption key using a local master key that is stored in a hardware security module of the edge device to generate a second version of the data encryption key. The edge device generates the second version of the data encryption key for the period of disconnection or low quality connection in case the key vault rotates, or changes, the network master key.

At operation 512, the edge device encrypts a second portion of the data stream using the second version of the data encryption key to produce a second encrypted portion of the data stream.

At operation 514, the edge device stores the second encrypted portion of the data stream locally (e.g., in local storage at the edge device).

At operation 516, the edge device determines that the network connection has been restored (e.g., the network connection is reestablished or the network connection returns to a state of sufficient quality).

At operation 518, the edge device receives a third version of the data encryption key from the cloud platform. The third version of the data encryption key is generated by re-encrypting the data encryption key using the network master key.

At operation 520, the edge device transmits, to the cloud platform via the restored network connection, the second encrypted portion of the data stream along with the third version of the data encryption key.

FIG. 6 is a flowchart depicting an example process 600 for securely managing a cluster of edge devices for data stream ingestion.

At operation 602, a cluster manager receives a data encryption key from a first edge device communicating with the cloud platform. The data encryption key is encrypted using a network master key stored in the cloud platform.

At operation 604, the cluster manager deploys a container for ingesting the data stream to a second edge device in a cluster of edge devices.

At operation 606, the cluster manager provides the data encryption key to the second edge device.

At operation 608, the cluster manager determines that the second edge device has failed and that the second edge device is no longer connected to the cloud platform.

At operation 610, the cluster manager deploys the container for ingesting the data stream to a third edge device in the cluster of edge devices.

At operation 612, the cluster manager provides the data encryption key to the third edge device.

Figure 7:
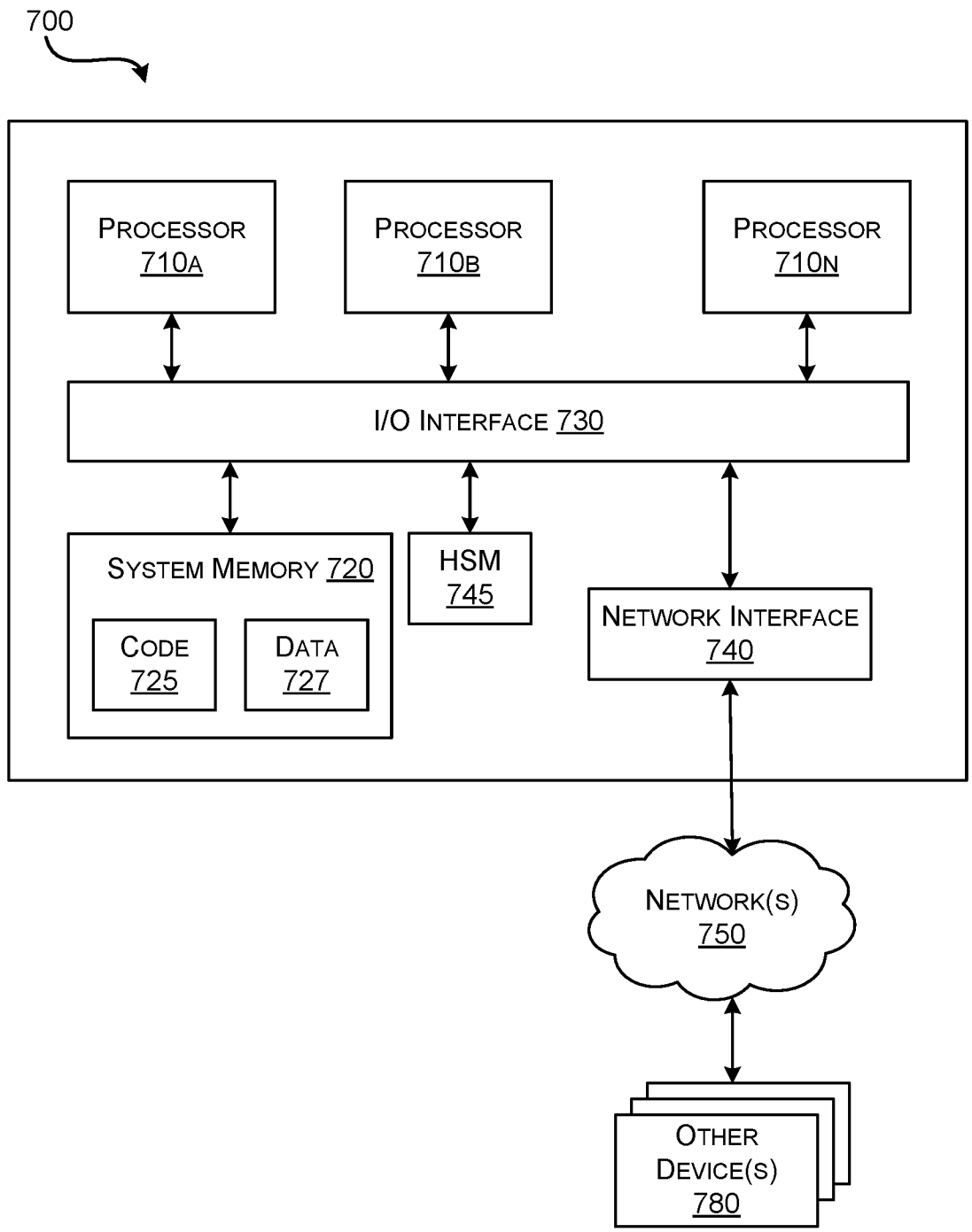
FIG. 7 is an example computing system in accordance with the present disclosure.

FIG. 7 illustrates a computing device 700. In the illustrated embodiment, computing device 800 includes one or more processors 710a, 710b, and/or 710n (which may be referred herein singularly as "a processor 710" or in the plural as "the processors 710") coupled to a system memory 720 via an input/output (I/O) interface 730. Computing device 700 further includes a network interface 740 coupled to I/O interface 730, as well as a hardware security module (HSM) 745.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x88, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 727.

In one embodiment, I/O interface 730 may be configured to coordinate I/O traffic between the processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 720, may be incorporated directly into processor 710.

Network interface 740 may be configured to allow data to be exchanged between computing device 700 and other device or devices 780 attached to a network or network(s) 750. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1-6 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

The disclosure presented herein also encompasses the subject matter set forth in the following clauses.

Example Clause A, a method implemented by an edge device configured to ingest a data stream for transmission to a cloud platform, the method comprising: receiving a first version of a data encryption key from the cloud platform via a network connection established between the edge device and the cloud platform, wherein the first version of the data encryption key is generated by encrypting the data encryption key using a network master key stored in the cloud platform; encrypting a first portion of the data stream using the first version of the data encryption key to produce a first encrypted portion of the data stream; transmitting, to the cloud platform via the network connection, the first encrypted portion of the data stream along with the first version of the data encryption key; determining that the edge device is disconnected from the cloud platform; in response to determining that the edge device is disconnected from the cloud platform: encrypting the data encryption key using a local master key that is stored in a hardware security module of the edge device to generate a second version of the data encryption key, wherein the second version of the data encryption key is generated in case the network master key is rotated during a period of disconnection; encrypting a second portion of the data stream using the second version of the data encryption key to produce a second encrypted portion of the data stream; storing the second encrypted portion of the data stream in local storage at the edge device; determining that the network connection has been restored; in response to determining that the network connection has been restored: receiving a third version of the data encryption key from the cloud platform via the restored network connection, wherein the third version of the data encryption key is generated by re-encrypting the data encryption key using the network master key stored in the cloud platform; and transmitting, to the cloud platform via the restored network connection, the second encrypted portion of the data stream along with the third version of the data encryption key.

Example Clause B, the method of Example Clause A, wherein the edge device is configured on a trust boundary defined by a tenant of the cloud platform that is ingesting the data stream.

Example Clause C, the method of Example Clause B, wherein the network master key is stored in a key vault that is owned by the tenant of the cloud platform that is ingesting the data stream.

Example Clause D, the method of Example Clause C, wherein the network master key is prohibited from leaving the key vault for security reasons.

Example Clause E, the method of any one of Example Clauses A through D, further comprising: encrypting a third portion of the data stream using the third version of the data encryption key to produce a third encrypted portion of the data stream; and transmitting, to the cloud platform via the restored network connection, the third encrypted portion of the data stream along with the third version of the data encryption key.

Example Clause F, the method of any one of Example Clauses A through D, further comprising: receiving an updated version of the data encryption key from the cloud platform via the restored network connection, wherein the updated version of the data encryption key is generated by encrypting the data encryption key using a rotated network master key stored in the cloud platform; encrypting a subsequent portion of the data stream using the updated version of the data encryption key to produce a subsequent encrypted portion of the data stream; and transmitting, to the cloud platform via the restored network connection, the subsequent encrypted portion of the data stream along with the updated version of the data encryption key.

Example Clause G, the method of any one of Example Clauses A through F, wherein each of the first version of the data encryption key, the second version of the data encryption key, and the third version of the data encryption key protects the data stream from exposure to untrusted components involved in the transmission of the data stream to the cloud platform and the storage of the data stream in the cloud platform.

Example Clause H, a device configured to ingest a data stream for transmission to a cloud platform, comprising: one or more processors; and computer storage media storing instructions that, when executed by the one or more processors, cause the device to perform operations comprising: receiving a first version of a data encryption key from the cloud platform via a network connection established between the device and the cloud platform, wherein the first version of the data encryption key is generated by encrypting the data encryption key using a network master key stored in the cloud platform; encrypting a first portion of the data stream using the first version of the data encryption key to produce a first encrypted portion of the data stream; transmitting, to the cloud platform via the network connection, the first encrypted portion of the data stream along with the first version of the data encryption key; determining that the device is disconnected from the cloud platform; in response to determining that the device is disconnected from the cloud platform: encrypting the data encryption key using a local master key that is stored in a hardware security module of the device to generate a second version of the data encryption key, wherein the second version of the data encryption key is generated in case the network master key is rotated during a period of disconnection; encrypting a second portion of the data stream using the second version of the data encryption key to produce a second encrypted portion of the data stream; storing the second encrypted portion of the data stream in local storage at the device; determining that the network connection has been restored; in response to determining that the network connection has been restored: receiving a third version of the data encryption key from the cloud platform via the restored network connection, wherein the third version of the data encryption key is generated by re-encrypting the data encryption key using the network master key stored in the cloud platform; and transmitting, to the cloud platform via the restored network connection, the second encrypted portion of the data stream along with the third version of the data encryption key.

Example Clause I, the device of Example Clause H, wherein the device is configured on a trust boundary defined by a tenant of the cloud platform that is ingesting the data stream.

Example Clause J, the device of Example Clause I, wherein the network master key is stored in a key vault that is owned by the tenant of the cloud platform that is ingesting the data stream.

Example Clause K, the device of Example Clause J, wherein the network master key is prohibited from leaving the key vault for security reasons.

Example Clause L, the device of any one of Example Clauses H through K, wherein the operations further comprise: encrypting a third portion of the data stream using the third version of the data encryption key to produce a third encrypted portion of the data stream; and transmitting, to the cloud platform via the restored network connection, the third encrypted portion of the data stream along with the third version of the data encryption key.

Example Clause M, the device of any one of Example Clauses H through K, wherein the operations further comprise: receiving an updated version of the data encryption key from the cloud platform via the restored network connection, wherein the updated version of the data encryption key is generated by encrypting the data encryption key using a rotated network master key stored in the cloud platform; encrypting a subsequent portion of the data stream using the updated version of the data encryption key to produce a subsequent encrypted portion of the data stream; and transmitting, to the cloud platform via the restored network connection, the subsequent encrypted portion of the data stream along with the updated version of the data encryption key.

Example Clause N, the device of any one of Example Clauses H through M, wherein each of the first version of the data encryption key, the second version of the data encryption key, and the third version of the data encryption key protects the data stream from exposure to untrusted components involved in the transmission of the data stream to the cloud platform and the storage of the data stream in the cloud platform.

Example Clause O, a method implemented by a cluster manager configured to deploy a container for ingesting a data stream for transmission to a cloud platform on a cluster of edge devices, the method comprising: receiving a data encryption key from a first edge device connected to the cloud platform via a network connection, wherein the data encryption key is encrypted using a network master key stored in the cloud platform; deploying the container for ingesting the data stream to a second edge device in the cluster of edge devices; providing the data encryption key to the second edge device; determining that the second edge device has failed and that the second edge device is no longer connected to the cloud platform; in response to determining that the second edge device has failed and that the second edge device is no longer connected to the cloud platform, deploying the container for ingesting the data stream to a third edge device in the cluster of edge devices; and providing the data encryption key to the third edge device.

Example Clause P, the method of Example Clause O, wherein each edge device in the cluster of edge devices is configured on a trust boundary defined by a tenant of the cloud platform that is ingesting the data stream.

Example Clause Q, the method of Example Clause P, wherein the network master key is stored in a key vault that is owned by the tenant of the cloud platform that is ingesting the data stream and the network master key is prohibited from leaving the key vault for security reasons.

Example Clause R, the method of Example Clause P or Example Clause Q, wherein the cluster of edge devices comprises private multi-access edge computing (MEC) nodes of a 5G network.

Example Clause S, the method of any one of Example Clauses O through R, further comprising deploying the container to a number of edge devices in the cluster of edge devices, the number of edge devices determined based on a resource capacity required to ingest the data stream.

Example Clause T, the method of any one of Example Clauses O through S, wherein each edge device in the cluster of edge devices includes a hardware security module to store the data encryption key.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method implemented by an edge device that is configured on a trust boundary defined by a tenant of a cloud platform and that is configured to ingest a data stream for transmission to the cloud platform, the method comprising:
    receiving a first version of a data encryption key from the cloud platform via a network connection established between the edge device and the cloud platform, wherein the first version of the data encryption key is generated by encrypting the data encryption key using a network master key stored in a key vault of the cloud platform that is owned by the tenant of the cloud platform;
    encrypting a first portion of the data stream using the first version of the data encryption key to produce a first encrypted portion of the data stream;
    transmitting, to the cloud platform via the network connection, the first encrypted portion of the data stream along with the first version of the data encryption key;
    determining that the edge device is disconnected from the cloud platform;
    in response to determining that the edge device is disconnected from the cloud platform:
        encrypting the data encryption key using a local master key that is stored in a hardware security module of the edge device to generate a second version of the data encryption key, wherein the second version of the data encryption key is generated in case the network master key is rotated during a period of disconnection;
        encrypting a second portion of the data stream using the second version of the data encryption key to produce a second encrypted portion of the data stream;
        storing the second encrypted portion of the data stream in local storage at the edge device;
    determining that the network connection has been restored;
    in response to determining that the network connection has been restored:
        receiving a third version of the data encryption key from the cloud platform via the restored network connection, wherein the third version of the data encryption key is generated by re-encrypting the data encryption key using the network master key stored in the cloud platform; and
        transmitting, to the cloud platform via the restored network connection, the second encrypted portion of the data stream along with the third version of the data encryption key.

2. The method of claim 1, wherein the network master key is prohibited from leaving the key vault for security reasons.

3. The method of claim 1, further comprising:
    encrypting a third portion of the data stream using the third version of the data encryption key to produce a third encrypted portion of the data stream; and transmitting, to the cloud platform via the restored network connection, the third encrypted portion of the data stream along with the third version of the data encryption key.

4. The method of claim 1, further comprising:
receiving an updated version of the data encryption key from the cloud platform via the restored network connection, wherein the updated version of the data encryption key is generated by encrypting the data encryption key using a rotated network master key stored in the cloud platform;
encrypting a subsequent portion of the data stream using the updated version of the data encryption key to produce a subsequent encrypted portion of the data stream; and
transmitting, to the cloud platform via the restored network connection, the subsequent encrypted portion of the data stream along with the updated version of the data encryption key.

5. The method of claim 1, wherein each of the first version of the data encryption key, the second version of the data encryption key, and the third version of the data encryption key protects the data stream from exposure to untrusted components involved in the transmission of the data stream to the cloud platform and the storage of the data stream in the cloud platform.

6. A device that is configured on a trust boundary defined by a tenant of a cloud platform and that is configured to ingest a data stream for transmission to the cloud platform, comprising:
one or more processors; and
computer storage media storing instructions that, when executed by the one or more processors, cause the device to perform operations comprising:
  receiving a first version of a data encryption key from the cloud platform via a network connection established between the device and the cloud platform, wherein the first version of the data encryption key is generated by encrypting the data encryption key using a network master key stored in a key vault of the cloud platform that is owned by the tenant of the cloud platform;
  encrypting a first portion of the data stream using the first version of the data encryption key to produce a first encrypted portion of the data stream;
  transmitting, to the cloud platform via the network connection, the first encrypted portion of the data stream along with the first version of the data encryption key;
  determining that the device is disconnected from the cloud platform;
  in response to determining that the device is disconnected from the cloud platform:
    encrypting the data encryption key using a local master key that is stored in a hardware security module of the device to generate a second version of the data encryption key, wherein the second version of the data encryption key is generated in case the network master key is rotated during a period of disconnection;
    encrypting a second portion of the data stream using the second version of the data encryption key to produce a second encrypted portion of the data stream;
    storing the second encrypted portion of the data stream in local storage at the device;
    determining that the network connection has been restored;
  in response to determining that the network connection has been restored:
    receiving a third version of the data encryption key from the cloud platform via the restored network connection, wherein the third version of the data encryption key is generated by re-encrypting the data encryption key using the network master key stored in the cloud platform; and
    transmitting, to the cloud platform via the restored network connection, the second encrypted portion of the data stream along with the third version of the data encryption key.

7. The device of claim 6, wherein the network master key is prohibited from leaving the key vault for security reasons.

8. The device of claim 6, wherein the operations further comprise:
encrypting a third portion of the data stream using the third version of the data encryption key to produce a third encrypted portion of the data stream; and
transmitting, to the cloud platform via the restored network connection, the third encrypted portion of the data stream along with the third version of the data encryption key.

9. The device of claim 6, wherein the operations further comprise:
receiving an updated version of the data encryption key from the cloud platform via the restored network connection, wherein the updated version of the data encryption key is generated by encrypting the data encryption key using a rotated network master key stored in the cloud platform;
encrypting a subsequent portion of the data stream using the updated version of the data encryption key to produce a subsequent encrypted portion of the data stream; and
transmitting, to the cloud platform via the restored network connection, the subsequent encrypted portion of the data stream along with the updated version of the data encryption key.

10. The device of claim 6, wherein each of the first version of the data encryption key, the second version of the data encryption key, and the third version of the data encryption key protects the data stream from exposure to untrusted components involved in the transmission of the data stream to the cloud platform and the storage of the data stream in the cloud platform.

11. A method implemented by a cluster manager configured to deploy a container for ingesting a data stream for transmission to a cloud platform on a cluster of edge devices that is configured on a trust boundary defined by a tenant of the cloud platform, the method comprising:
receiving a data encryption key from a first edge device connected to the cloud platform via a network connection, wherein the data encryption key is encrypted using a network master key stored in a key vault of the cloud platform that is owned by the tenant of the cloud platform;
deploying the container for ingesting the data stream to a second edge device in the cluster of edge devices;
providing the data encryption key to the second edge device;
determining that the second edge device has failed and that the second edge device is no longer connected to the cloud platform;

in response to determining that the second edge device has failed and that the second edge device is no longer connected to the cloud platform, deploying the container for ingesting the data stream to a third edge device in the cluster of edge devices; and providing the data encryption key to the third edge device.

12. The method of claim 11, wherein the network master key is prohibited from leaving the key vault for security reasons.

13. The method of claim 11, wherein the cluster of edge devices comprises private multi-access edge computing (MEC) nodes of a 5G network.

14. The method of claim 11, further comprising deploying the container to a number of edge devices in the cluster of edge devices, the number of edge devices determined based on a resource capacity required to ingest the data stream.

15. The method of claim 11, wherein each edge device in the cluster of edge devices includes a hardware security module to store the data encryption key.

16. The method of claim 1, wherein the trusted boundary is associated with an on-premises network in which communications are secured by the tenant.

17. The device of claim 6, wherein the trusted boundary is associated with an on-premises network in which communications are secured by the tenant.

18. The method of claim 11, wherein the trusted boundary is associated with an on-premises network in which communications are secured by the tenant.

* * * * *